United States Patent
Salter et al.

(10) Patent No.: US 10,011,182 B2
(45) Date of Patent: Jul. 3, 2018

(54) INDUCTIVE CHARGER ALIGNMENT SYSTEMS FOR VEHICLES

(71) Applicant: Ford Global Technologies, LLC, Dearborn, MI (US)

(72) Inventors: Stuart C. Salter, White Lake, MI (US); Christopher A. Danowski, Rochester Hills, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/079,825

(22) Filed: Mar. 24, 2016

(65) Prior Publication Data

US 2017/0274787 A1    Sep. 28, 2017

(51) Int. Cl.
*B60L 11/18*    (2006.01)

(52) U.S. Cl.
CPC ......... *B60L 11/1829* (2013.01); *B60L 11/182* (2013.01); *B60L 11/1835* (2013.01)

(58) Field of Classification Search
CPC .. B60L 11/1829; B60L 11/182; B60L 11/1835
See application file for complete search history.

(56) References Cited

U.S. PATENT DOCUMENTS

| | | | | |
|---|---|---|---|---|
| 4,813,758 A * | 3/1989 | Sanders | ................... | B60Q 1/48 116/28 R |
| 5,461,298 A | 10/1995 | Lara et al. | | |
| 5,736,925 A * | 4/1998 | Knauff | ................. | B60Q 1/2611 340/463 |
| 6,130,506 A * | 10/2000 | Lopez | ................... | B60Q 1/0023 307/10.8 |
| 6,157,162 A * | 12/2000 | Hayashi | ............... | B60L 11/1818 320/104 |
| 6,776,117 B2 * | 8/2004 | D'Onofrio | .............. | E04H 6/426 116/28 R |
| 8,244,460 B2 * | 8/2012 | Kubota | .............. | G01C 21/3697 345/441 |
| 8,884,581 B2 * | 11/2014 | Widmer | ................ | B60L 11/182 320/108 |

(Continued)

FOREIGN PATENT DOCUMENTS

| | | |
|---|---|---|
| CN | 104670037 A | 6/2015 |
| DE | 102014217056 A1 | 3/2015 |

(Continued)

*Primary Examiner* — Naum B Levin (74) *Attorney, Agent, or Firm* — Jason Rogers; Price Heneveld LLP (57) ABSTRACT

An inductive charger alignment system for a vehicle that includes: a plurality of on-board inductive receiving coils adapted to charge an on-board power source; an alignment controller coupled to the coils; an on-board signal element, e.g., a pair of headlamps, coupled to the controller; and an off-board inductive transmitter coil. Further, the controller is configured to direct the element to communicate an alignment between the receiving coils and the transmitter coil to an on-board driver. The alignment may include vehicle forward and side-to-side alignment between the receiving coils and the off-board transmitter coil.

17 Claims, 4 Drawing Sheets

(56) References Cited

U.S. PATENT DOCUMENTS

| | | | | |
|---|---|---|---|---|
| 8,917,056 B2* | 12/2014 | Jung | ............. | H02J 5/005 |
| | | | | 320/108 |
| 9,114,720 B2* | 8/2015 | Oman | ............. | B60L 11/1829 |
| 9,260,026 B2* | 2/2016 | Miller | ............. | B60L 11/1846 |
| 9,379,571 B2* | 6/2016 | Boyer | ............. | B60L 11/182 |
| 9,404,954 B2* | 8/2016 | Roy | ............. | G01V 3/081 |
| 9,472,338 B2* | 10/2016 | Keeling | ............. | H01F 27/38 |
| 9,477,893 B2* | 10/2016 | Findeisen | ............. | G06K 9/00791 |
| 9,631,950 B2* | 4/2017 | Raedy | ............. | B60L 11/182 |
| 9,802,501 B2* | 10/2017 | Krammer | ............. | B62D 15/025 |
| 2011/0066515 A1* | 3/2011 | Horvath | ............. | B60L 11/1818 |
| | | | | 705/17 |
| 2011/0140658 A1* | 6/2011 | Outwater | ............. | B60L 11/1824 |
| | | | | 320/109 |
| 2011/0221387 A1* | 9/2011 | Steigerwald | ............. | B60L 11/182 |
| | | | | 320/108 |
| 2013/0024059 A1* | 1/2013 | Miller | ............. | H02J 50/12 |
| | | | | 701/22 |
| 2013/0033224 A1* | 2/2013 | Raedy | ............. | H02J 7/025 |
| | | | | 320/107 |
| 2014/0015493 A1 | 1/2014 | Wirz et al. | | |
| 2014/0070623 A1* | 3/2014 | Keeling | ............. | H02J 50/12 |
| | | | | 307/104 |
| 2016/0185236 A1* | 6/2016 | Lee | ............. | B60L 11/182 |
| | | | | 320/106 |

FOREIGN PATENT DOCUMENTS

| | | | |
|---|---|---|---|
| EP | 1061631 A1 | 12/2000 | |
| WO | 2015144335 A1 | 10/2015 | |
| WO | 2015158589 A1 | 10/2015 | |

* cited by examiner

INDUCTIVE CHARGER ALIGNMENT SYSTEMS FOR VEHICLES

FIELD OF THE INVENTION

The present invention generally relates to inductive charger alignment systems for vehicles and, in more particular embodiments, to inductive charger alignment systems for vehicles that employ an on-board signal element to communicate alignment information to the driver of the vehicle.

BACKGROUND OF THE INVENTION

Modern vehicles include various electronic components and systems that require significant power usage while parked. For example, many modern vehicles employ alarm systems with associated sensors and alarms that require power while parked. Other modern vehicles include status reporting systems and other electronic components that drain power while parked. Vehicle battery drain can be a significant problem for modern vehicles, particularly when the vehicles remained parked for long periods on the order of many months. Classic vehicles, while generally not including as many electronic components and systems as modern vehicles, also can experience battery drain when parked for prolonged periods. As classic vehicles are not frequently driven by their owners, battery drain remains a significant concern.

Many modern vehicles are powered by fully-electric or hybrid-electric engines with one or more rechargeable power sources. While the duration of a charge associated with the power sources associated with these vehicles is increasing through new technologies, it remains essential that an owner of such vehicles have options for charging the power sources of these vehicles at home, work or other locations where the vehicle is frequently parked. Further, the options for charging these vehicles must be simple to accommodate various levels of driver physical capabilities.

Conventional approaches for charging vehicular power sources, whether a passive source or an active source for an engine, generally require a user to plug a power cord into the vehicle. Trickle chargers, frequently employed to maintain a charge on a battery of a classic vehicle, require the user to open the hood of the vehicle and then physically attach the trickle charger for the duration of any parking event. When the user wishes to drive the vehicle, the individual must remove the trickle charger and then close the hood. Other conventional approaches to charging a power source for a fully-electric or hybrid-electric vehicle require the user to insert a plug-in power cord into a power receptacle of the vehicle until charging is complete and then remove the power cord before driving the vehicle.

Wireless charging approaches, including inductive charging systems, have been employed with varying degrees of success to charge various active power sources (e.g., power sources for the engines of fully-electric and hybrid-electric vehicles) and passive power sources (e.g., power sources for vehicle anti-theft systems). While such charging approaches are advantageous in requiring little, if any, physical actions by the driver of the vehicle to effect the charging compared to other conventional approaches (e.g., manipulation of trickle chargers, plug-in power cords, etc.), they often require much longer charging durations and exhibit low charging efficiency. In an inductive charger system, for example, the alignment of the charging coils can drive charging efficiency, and conventional inductive charger systems often fail to account for alignment.

Further, conventional inductive charging systems that include some alignment capability generally convey alignment information to a driver with off-board displays, which can add significant cost to the system. As a display is needed at each charging location, the overall system cost is increased with each additional display.

Accordingly, there is a need for inductive charger alignment systems for vehicles that are configured to ensure high charging efficiency, low product cost and high flexibility of use in various environments (e.g., home, work, commercial parking lots, etc.).

SUMMARY OF THE INVENTION

According to one aspect of the present invention, an inductive charger alignment system for a vehicle is provided that includes: an on-board inductive receiving coil adapted to charge an on-board power source; an alignment controller coupled to the coil; and a headlamp coupled to the controller. Further, the controller is configured to direct the headlamp to communicate an alignment between the receiving coil and an off-board inductive transmitter coil to an on-board driver.

According to another aspect of the present invention, an inductive charger alignment system for a vehicle is provided that includes: a plurality of on-board inductive receiving coils adapted to charge an on-board power source; an alignment controller coupled to the coils; and an on-board signal element coupled to the controller. Further, the controller is configured to direct the element to communicate an alignment between the receiving coils and an off-board inductive transmitter coil to an on-board driver.

According to a further aspect of the present invention, an inductive charger alignment system for a vehicle is provided that includes: a plurality of on-board inductive receiving coils adapted to charge an on-board power source; an alignment controller coupled to the coils; an on-board signal element coupled to the controller; and an off-board inductive transmitter coil. Further, the controller is configured to direct the element to communicate an alignment between the receiving coils and the transmitter coil to an on-board driver.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
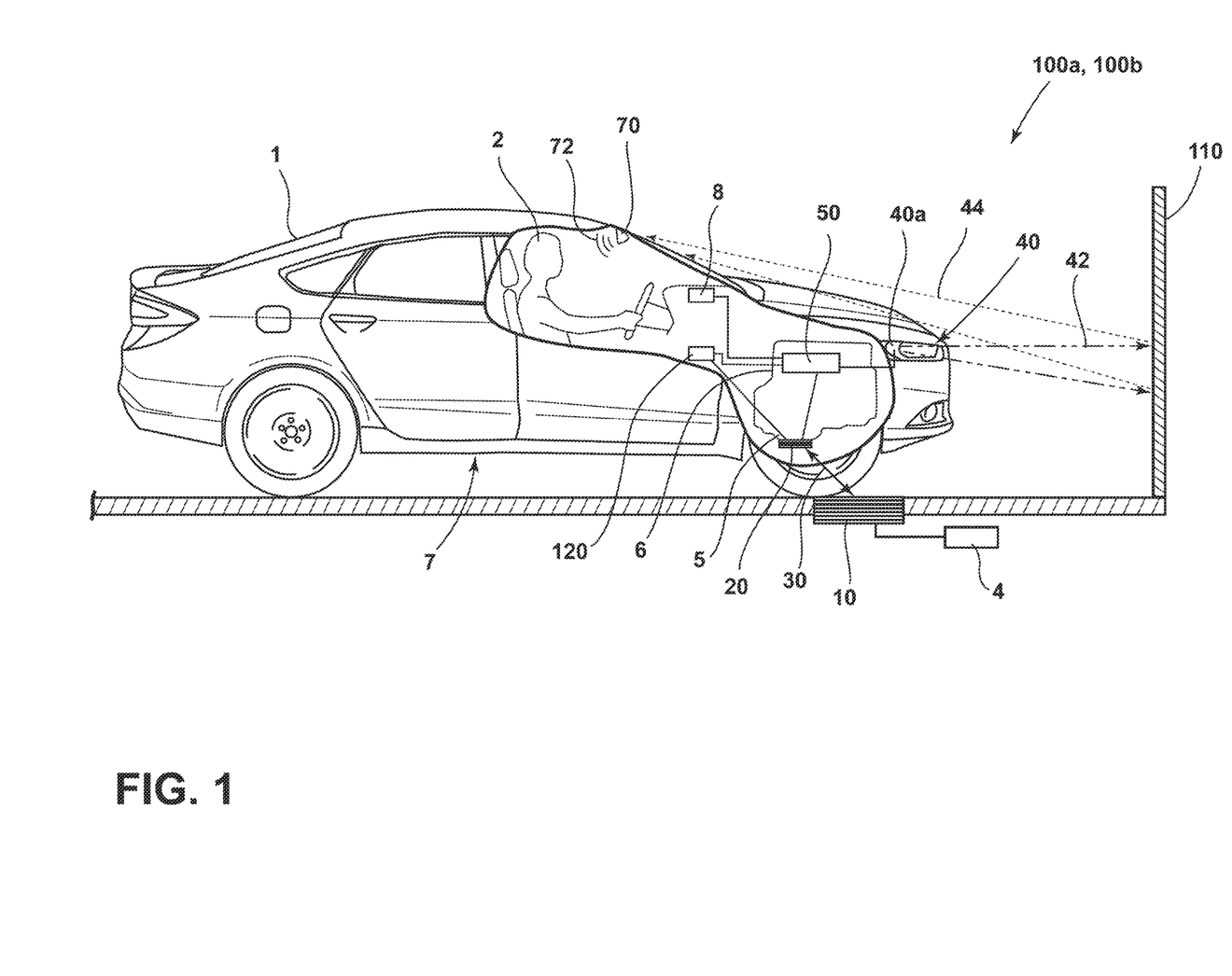
FIG. 1 is a side perspective, schematic view of an inductive charger alignment system for a vehicle according to an aspect of the disclosure.
Figure 1A:
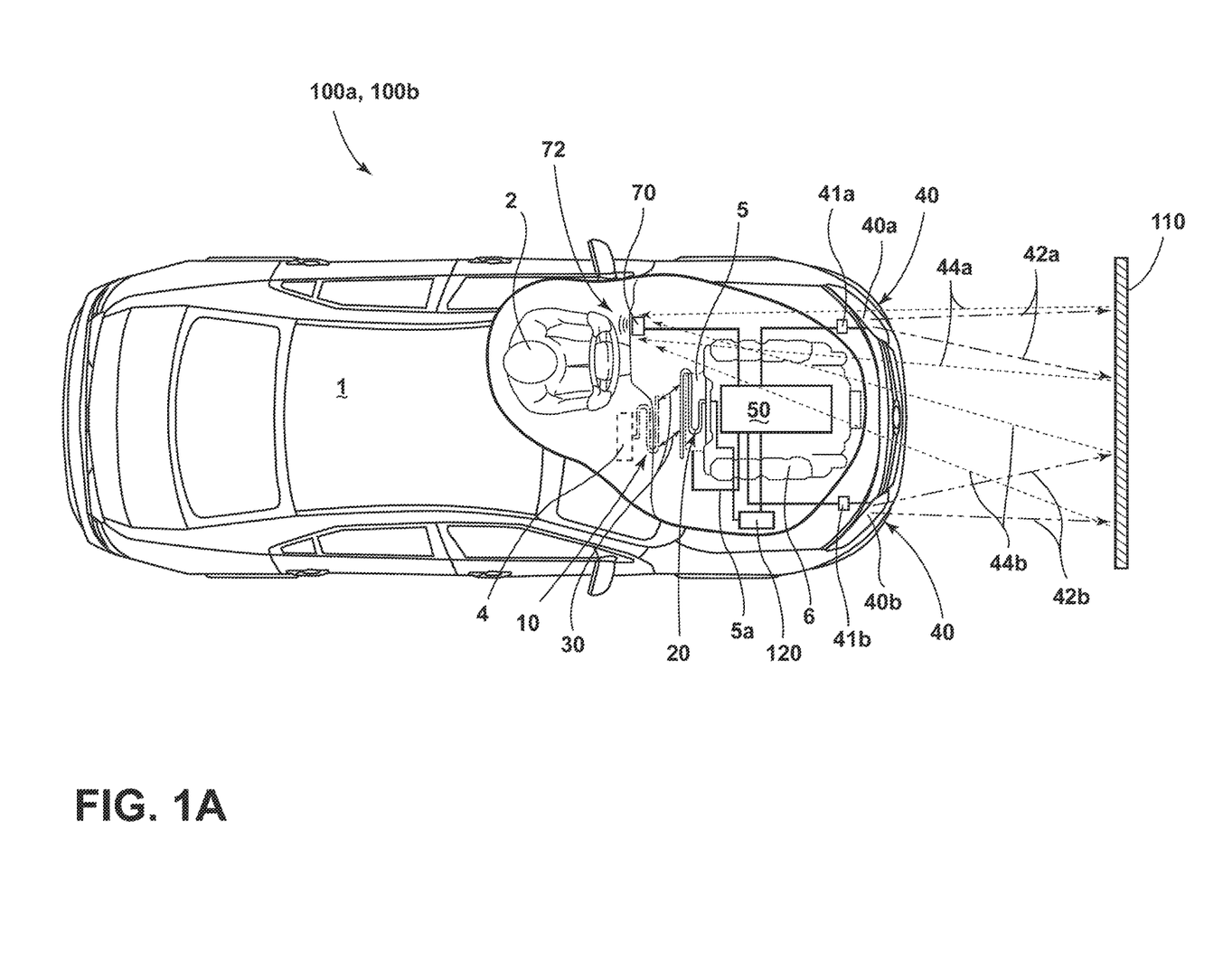
FIG. 1A a top-down schematic view of the inductive charger alignment system of FIG. 1.
Figure 2A:
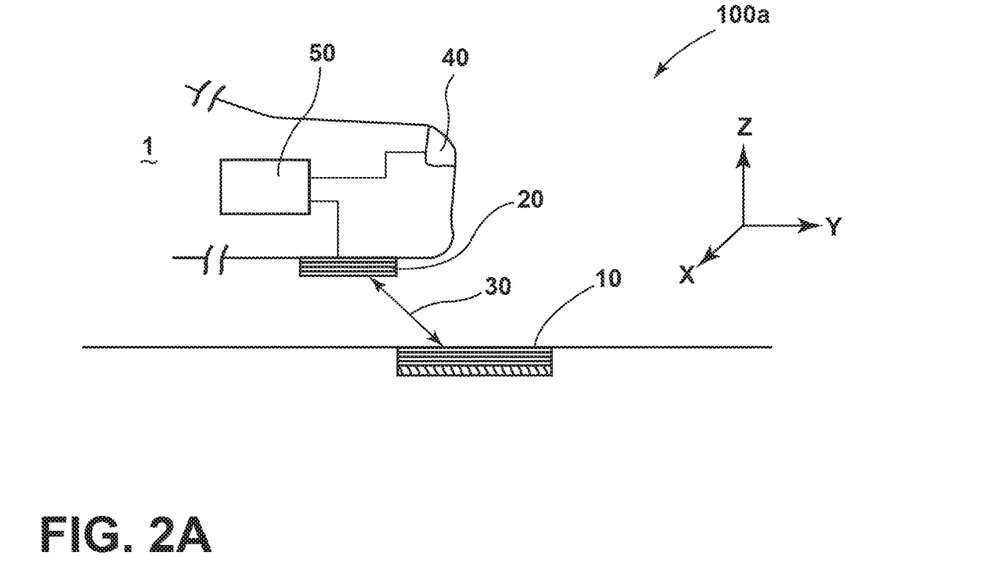
FIG. 2A is a side, cross-sectional schematic view of a portion of an inductive charger alignment system for a vehicle that includes an on-board inductive receiving coil and an on-board signal element according to an additional aspect of the disclosure.

For purposes of description herein, the terms "upper," "lower," "right," "left," "rear," "front," "vertical," "horizontal," "interior," "exterior," "vehicle forward," "vehicle rearward," "vehicle side-to-side" and derivatives thereof shall relate to the invention as oriented in FIGS. 1, 1A and 2A. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Described in this disclosure are inductive charger alignment systems for vehicles and, in more particular embodiments, inductive charger alignment systems for vehicles that employ an on-board signal element to communicate alignment information to the driver of the vehicle. Aspects of the disclosure include inductive charger alignment systems for vehicles (e.g., automobiles, all-terrain vehicles, trucks, buses, snow-mobiles, and other wheeled vehicles) with on-board inductive receiving coil(s), an on-board alignment controller and at least one on-board signal element (e.g., a headlamp). These systems convey alignment information associated with the alignment between the inductive charger receiving coil(s) and an off-board transmitter coil through the signal element to the driver of the vehicle having such a system.

Referring to FIGS. 1 and 1A, an inductive charger alignment system 100a, 100b for a vehicle 1 is provided in exemplary form. The alignment system 100a, 100b includes an on-board inductive receiving coil 20 adapted to charge an on-board power source 120; and an alignment controller 50 coupled to the coil 20. The system 100a, 100b also includes a signal element 40 that is coupled to the controller 50. Further, the controller 50 is configured to direct the signal element 40 to communicate an alignment 30 between the receiving coil 20 and an off-board inductive transmitter coil 10 to an on-board driver 2.

As depicted in exemplary form in FIGS. 1 and 1A, an inductive charger alignment system 100a, 100b can be employed by a driver 2 of a vehicle 1 containing the system to align the inductive receiving coil 20 with the off-board inductive transmitter coil 10 such that the alignment 30 is minimized. By minimizing the magnitude of the alignment 30 between the coils 10, 20 with the use of system 100a, 100b, a driver 2 in the vehicle 1 can maximize the efficiency of inductive charging of the power source 120 coupled to the receiving coil 20 by the transmitter coil 10. As readily understood by those in the field of inductive charging, minimizing the alignment 30 between the coils 10, 20 serves to improve inductive charging efficiency, independent of whether the system is specifically configured for a tightly coupled charging (TCC) or a loosely coupled charging (LCC) approach. Further, minimizing the alignment 30 between the coils 10, 20 serves to reduce the likelihood of undesired heat generation in surrounding metallic components on the vehicle, interference by foreign objects in proximity to the coils and inadvertent exposure of humans and animals to high electromagnetic fields (EMF) generated in proximity to the coils during an inductive charging operation.

As depicted in exemplary form in FIGS. 1 and 1A, the inductive charger alignment system 100a, 100b can be configured such that the on-board receiving coil 20, located on the underside 7 of the vehicle 1, is coupled to and adapted to charge a power source 120 that serves to power an engine 6 (e.g., a hybrid-electric or an all-electric engine) of the vehicle 1. The power source 120 (see FIG. 1A) can also be coupled to the alignment controller 50. As the on-board inductive receiving coil 20 moves into proximity of the off-board inductive transmitter coil 10, an off-board power source 4 coupled to the coil 10 can energize the coil 10 and begin charging the power source 120 coupled to the on-board receiving coil 20 and controller 50 on the vehicle 1.

In certain aspects of the inductive charger alignment systems 100a, 100b depicted in FIGS. 1 and 1A, the alignment controller 50 can assess the charging signal generated within the on-board inductive receiving coil 20 and compare it to a predetermined, maximum charging level that corresponds to a minimum alignment distance between the coils 10, 20. Thus, an optimal alignment condition between the coils 10, 20 occurs when the alignment 30, as corresponding to the actual alignment between the coils 10, 20, approaches the minimum alignment distance between the coils 10, 20. As also shown in FIGS. 1 and 1A, the controller is coupled to a signal element 40 (e.g., a headlamp 40a) and can direct the signal element 40 to communicate the alignment 30 between the coils 10, 20 to the driver 2. More particularly, the controller 50 can control the output light pattern 42 of the headlamp 40a to produce a reflected light pattern 44 observable by the driver 2. In certain aspects, the reflected light pattern 44 is obtained by directing the headlamp 40a to produce an output light pattern 42 that strikes a wall 110 of an enclosure or structure containing the transmitter coil 10. For example, the transmitter coil 10 can be positioned in proximity to a wall 110 such that an output light pattern 42 from the headlamp 40a will strike the wall 110 when the vehicle 1 is positioned by the driver 2 such that the coils 10, 20 are within proximity to one another.

In certain embodiments, the alignment controller 50 can vary the frequency, intensity or other output variable associated with the output light pattern 42 of the headlamp 40a which, in turn, varies the reflected light pattern 44. Hence, the controller 50 can vary the reflected light pattern 44 to communicate the alignment 30 of the inductive off-board receiving and on-board transmitter coils 10, 20 to the driver 2. For example, the controller 50 can increase the frequency of illumination of the headlamp 40a as a function of alignment 30 as it approaches the minimum alignment distance between the coils 10, 20. Similarly, the controller 50 can decrease the frequency of illumination of the headlamp 40a as the alignment 30 increases relative to the minimum alignment distance between the coils 10, 20. The net effect is that the driver 2 of the vehicle 1 containing the inductive charger alignment system 100a, 100b can receive alignment information associated with the coils 10, 20 and use that information to adjust the location of the vehicle 1 to maximize inductive charging efficiency for the power source 120 coupled to the on-board receiving coil 20.

In another aspect of the exemplary embodiment of the inductive charging system 100a, 100b depicted in FIGS. 1 and 1A, the alignment controller 50 can be coupled to an on-board light sensor 8 and an alarm element 70 located in the interior of the vehicle 1. For example, the light sensor 8 may be a standard vehicular day/night sensor configured to aid in the automatic control of headlamps and other vehicular features for daytime and night-time illumination. The light sensor 8 may also be a separate, dedicated sensor configured to sense reflected light (e.g., reflected light pattern 44) from the signal element 40 (e.g., headlamp 40a). The alarm element 70, as depicted in FIGS. 1 and 1A, can be an audible alarm capable of producing a variable audible state 72. In certain aspects, the alarm element 70 can be a signal element that is configured to provide a visual alarm state (not shown) to the driver 2. More generally, in these aspects, the alignment controller 50 of the system 100a, 100b can detect the existence of a reflected light pattern 44 through input from the light sensor 8. For situations in which no reflected light pattern 44 is detected by the controller 50 (e.g., the vehicle 1 is positioned in proximity to a transmitter coil 10 in an open-air parking lot without a wall 110 to direct a reflected light pattern 44 back toward the driver 2), the controller 50 can communicate alignment 30 between the on-board inductive receiving and off-board transmitter coils 20, 10 through activation and control of the alarm element 70. For example, the controller 50 can increase the frequency of audible state 72 of the alarm element 70 as the alignment 30 approaches the minimum alignment distance between the coils 10, 20. Similarly, controller 50 can decrease the frequency of an audible state 72 of the alarm element 70 as the alignment 30 increases relative to the minimum alignment distance between the coils 10, 20. The net effect is that the driver 2 of the vehicle 1 containing the inductive charger alignment system 100a, 100b can receive alignment information associated with the coils 10, 20 and use that information to adjust the location of the vehicle 1 to maximize inductive charging efficiency for the power source 120 coupled to the on-board receiving coil 20 in situations in which a reflected light pattern 44 from the headlamp 40a (or other reflected pattern from a signal element 40 in the form of a turn signal, for example) is not available.

In a further aspect of the exemplary embodiments of the inductive charger alignment system 100a, 100b depicted in FIGS. 1 and 1A, the systems can be configured with an additional oil heating function. More particularly, in this aspect, the on-board inductive receiving coil 20 is affixed to an oil pan 5 of an engine 6 of the vehicle 1. Further, the receiving coil 20 is configured to heat oil in the oil pan 5 upon charging from the off-board inductive transmitter coil 10. As shown in FIG. 1A, a thermocouple 5a can be coupled to the pan 5 and alignment controller 50 to facilitate control of the oil heating process by the controller 50. That is, the controller 50 can monitor temperature of the oil in the oil pan 6 via the thermocouple 5a, and the oil is heated through thermal conduction between the coil 20 and the oil pan 6 upon inductive charging of the receiving coil 20 by the off-board transmitter coil 10. Once a predetermined temperature is reached in the oil, the controller 50 can, for example, switch off inductive charging of the receiving coil 20 by directing the charging current (e.g., by an internal switch) to an internal thermal mass (not shown), or wirelessly communicating with the power source 4 of the off-board inductive transmitter coil 10 to deactivate it.

Referring again to FIG. 1A, a further aspect of the exemplary inductive charger alignment system 100a, 100b relates to the communication of dimensional components of the alignment 30 between the off-board inductive transmitter and on-board inductive receiving coils 10, 20 to the driver 2 of the vehicle 1. As depicted, the alignment controller 50 can be coupled via solid state relays 41a, 41b to a signal element 40 in the form of left and right headlamps 40a and 40b, respectively. Depending on the quantity and arrangement of the on-board receiving coil 20 and the off-board transmitter coil 10, the alignment 30 information obtained by the controller 50 can be resolved into vehicular side-to-side, alignment components. That is, controller 50 can obtain an alignment 30 that relates to the relative alignment of the on-board receiving coil 20 left or right of the off-board transmitter coil 10 in the vehicular side-to-side direction (i.e., in the direction normal to the vehicle forward direction). For example, an arrangement of inductive charger alignment system 100a, 100b with an on-board receiving coil 20 in the form of two independent coils, spaced equally apart in the side-to-side direction, can provide such a capability. In particular, the controller 50 can assess the charging signal generated within each of the coils that are part of the on-board receiving coil 20 and compare the respective signals to a predetermined, maximum charging level that corresponds to a minimum alignment distance between the coils 10, 20. Based on this information, the controller 50 can assess which coil (i.e., the left- or right-hand coil) is charging at less than maximum efficiency (or which coil is charging at a lower efficiency compared to the other coil) and thus determine which of the two coils that make up the receiving coil 20 is misaligned relative to the off-board transmitter coil 10. Using this information, the controller 50 can then increase the frequency of illumination of the left headlamp 40a (via relay 41a) or the right headlamp 40b (via relay 41b) as a function of the left and right components of the alignment 30 information as the left or right-hand coil of the receiving coil 20 approaches the minimum alignment distance between the coils 10, 20. As the frequency of illumination of the headlamps 40a, 40b is changed by the controller 50, the output light patterns 42a, 42b and the reflected light patterns 44a, 44b are likewise varied to communicate the alignment 30 to the driver 2. When both of the left- and right-hand coils of the on-board receiving coil 20 are substantially aligned relative to the off-board transmitter coil 10, the controller 50 can adjust the frequency of illumination of the left and right headlamps 40a, 40b to be about equal to one another. The net effect is that the driver 2 of the vehicle 1 containing the inductive charger alignment system 100a, 100b can receive vehicular side-to-side alignment information associated with the coils 10, 20 and use that information to adjust the location of the vehicle 1 to maximize inductive charging efficiency for the power source 120 coupled to the on-board receiving coil 20.

In some aspects of the inductive charger alignment system 100a, 100b of the disclosure, as depicted in FIGS. 1 and 1A, the vehicle 1 can be a modern automobile, classic or vintage automobile, truck, bus, all-terrain vehicle, or any other vehicle with one or more power sources (e.g., power source 120) that may be charged through inductive coupling via an on-board inductive receiving coil 20 and an off-board inductive transmitter coil 10. Further, the vehicle 1 can be non-autonomous, semi-autonomous or fully-autonomous. For semi- and fully-autonomous vehicles, the alignment controller 50 can be configured to communicate alignment 30 to a separate controller (not shown) or other controller integral with the controller 50 that is responsible for controlling and effecting movement of the vehicle 1.

In certain aspects of the inductive charger alignment system 100a, 100b, the off-board inductive transmitter coil 10 depicted in FIGS. 1 and 1A can include one coil or multiple coils. While adding additional coils as part of the transmitter coil 10 can increase overall system cost, some aspects of the systems 100a, 100b can benefit from increasing the number of coils that are employed in the off-board coil 10. In embodiments of the system 100a, 100b with multiple coils as the off-board inductive transmitter coil 10, an additional controller (not shown) coupled to the coils that make up coil 10 can be configured to wirelessly communicate with the alignment controller 50. In particular, this off-board controller can provide relative charging efficiency information associated with inductive power transmission from each of the off-board coils (i.e., as components of the off-board coil 10 element) to the controller 50. The controller 50 can then compare these charging efficiency levels to a predetermined maximum charging efficiency associated with the closest alignment between the on-board and off-board coils 10, 20 to obtain the dimensional components of the alignment 30. As noted earlier, the controller 50 can then utilize the dimensional components of the alignment 30 to communicate with the driver 2 of the vehicle 1 by, for example, varying the frequency of illumination of the signal element 40 (e.g., left and right headlamps 40a, 40b).

Figure 2B:
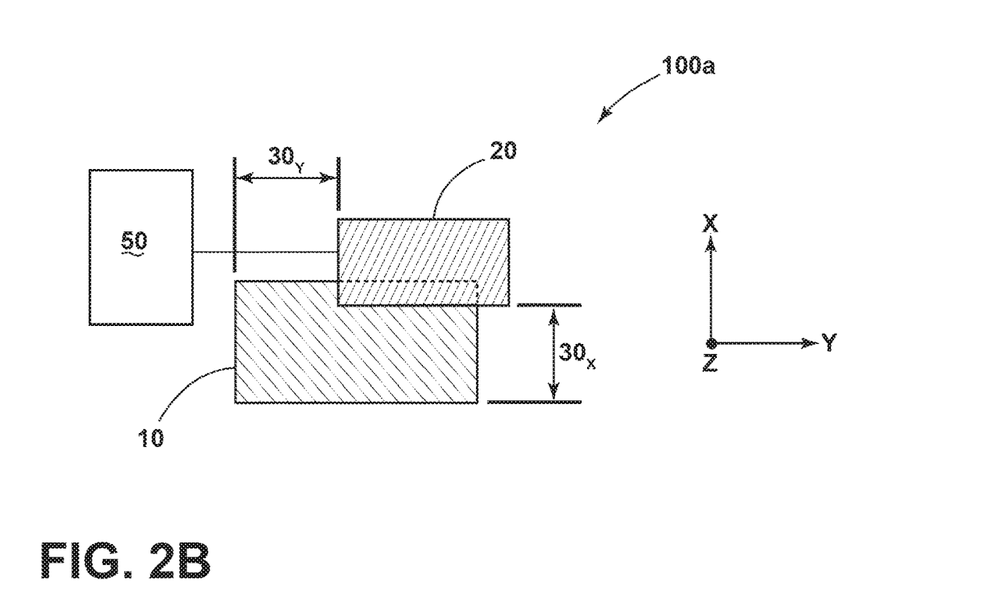
FIG. 2B is a top-down schematic view of a portion of the inductive charger alignment system of FIG. 2A showing a dis-alignment of the on-board charger coil and an off-board inductive transmitter coil.
Figure 3A:
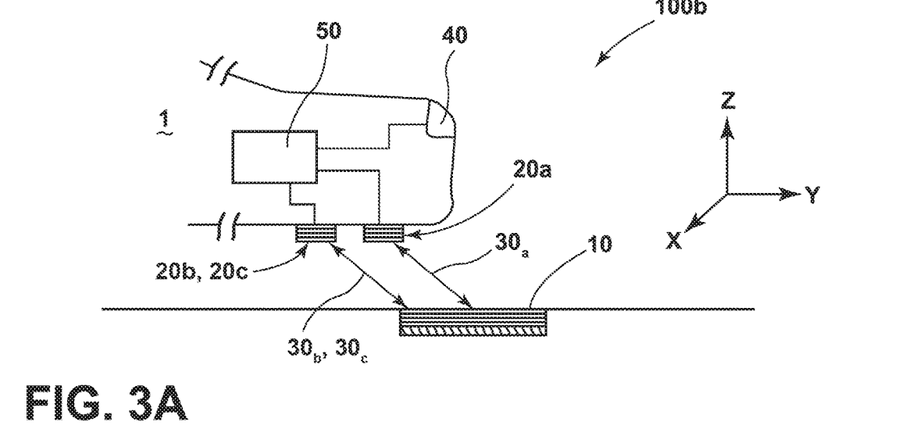
FIG. 3A is a side, cross-sectional schematic view of a portion of an inductive charger alignment system for a vehicle that includes three inductive receiving coils and an on-board signal element according to an additional aspect of the disclosure.
Figure 3B:
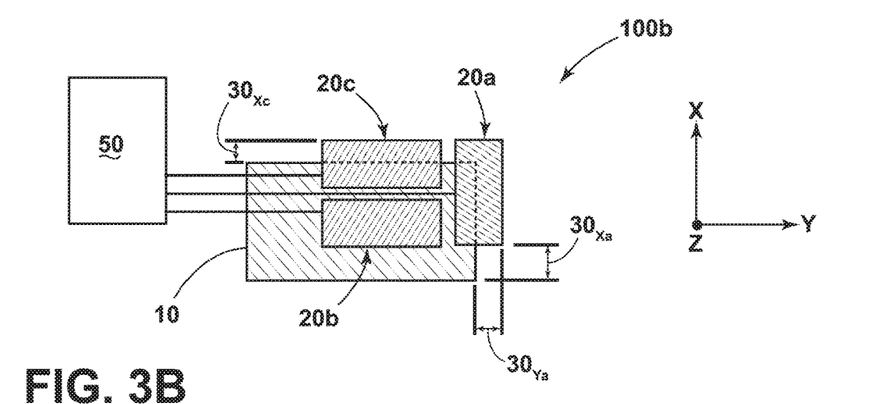
FIG. 3B is a top-down schematic view of a portion of the inductive charger alignment system of FIG. 3A showing a dis-alignment of two of the on-board charger coils and an off-board inductive transmitter coil.
Figure 3C:
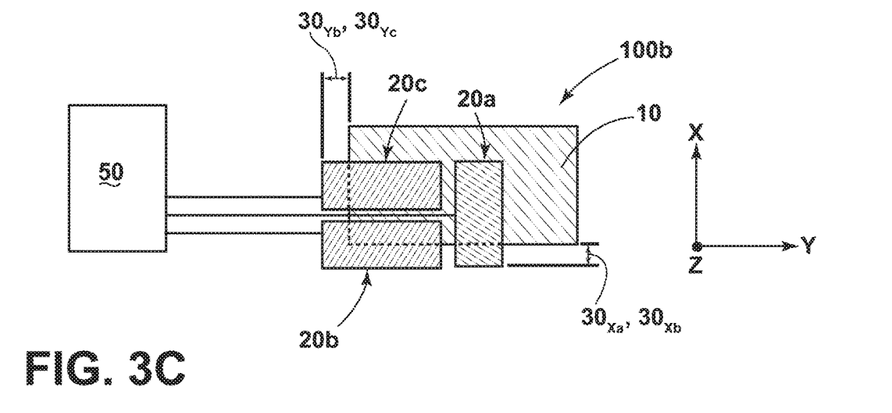
FIG. 3C is a top-down schematic view of a portion of the inductive charger alignment system of FIG. 3A showing a misalignment of two of the on-board charger coils and an off-board inductive transmitter coil.

Referring again to FIGS. 1 and 1A, aspects of the inductive charger alignment system 100a, 100b employ an on-board inductive receiving coil 20 in the form of one coil (i.e., system 100a, as also depicted in FIGS. 2A and 2B) or multiple coils (i.e., system 100b as also depicted in FIGS. 3A-3C). While adding additional coils as part of the on-board inductive receiving coil 20 can increase overall system cost, some aspects of the inductive charger alignment system can significantly benefit from increasing the number of coils that are employed in the on-board coil 20. In embodiments of the system 100b with multiple coils as the on-board inductive transmitter coil 20, the alignment controller 50 coupled to the coils (i.e., the coil components that make up coil 20) can, as noted earlier, obtain the dimensional components of the alignment 30 based on a comparison of the charging efficiency levels for each of the coils relative to a predetermined maximum charging efficiency associated with the closest alignment between the on-board and off-board coils 10, 20. As also noted earlier, the alignment controller 50 can then utilize the dimensional components of the alignment 30 to communicate with the driver 2 of the vehicle 1 by, for example, varying the frequency of illumination of the signal element 40 (e.g., left and right headlamps 40a, 40b).

Referring again to FIGS. 1 and 1A, the inductive charger alignment system 100a, 100b can employ an off-board transmitter and on-board inductive receiving coils 10, 20 with any of a variety of shape factors including but not limited to circular, rectangular, square, elliptical and other patterns suitable for inductive power transfer. As understood by those in the field, the off-board transmitter coil 10 can be laminated or otherwise encased in a package suitable for use in various environments suitable for parking or idling the vehicle 1 (e.g., parking lot, garage, etc.). Similarly, the on-board receiving coil 20 can be laminated or otherwise encased in a package suitable for use in various environments associated with the exterior of vehicle 1, preferably the underside 7 of the vehicle 1. The off-board transmitter and on-board receiving coils 10, 20 may also be fabricated from various materials and components, including conductive elements, suitable for inductive power transfer and resistance to environmental conditions including humidity, heat, road salt, sunlight and other environmental factors.

The on-board inductive receiving coil 20 of the inductive charger alignment system 100a, 100b can be placed in a variety of locations on the exterior (or embedded within the exterior) of the vehicle 1. Typically, the receiving coil 20, whether comprising one or multiple independent coils, is located on the underside 7 of the vehicle. Preferably, the receiving coil 20 is located in proximity to or coupled to non-metallic components on the underside 7 including but not limited to rocker trim and bumper fascia. Various fastening techniques can be employed to affix the receiving coil 20 to the vehicle 1 as understood by those in the field of the disclosure including but limited to peel and stick adhesives, metal fasteners, rivets, brackets, etc. Similarly, the receiving coil 20 can be affixed to a mounting location set apart from metallic components. Situating the on-board receiving coil 20 away from metallic vehicular components can reduce or eliminate inadvertent inductive heating of metallic vehicular components in proximity to the off-board inductive transmitter coil 10 when the vehicle 1 is moved such that the coils 10, 20 are in close or minimum alignment relative to one another. As noted earlier, however, an additional embodiment of the inductive charger alignment system 100a, 100b purposely situates the receiving coil 20 in close proximity to the oil pan 5 (which may comprise metals) of the engine 6 of the vehicle 1 to facilitate heating of oil in the oil pan 5 during inductive charging of the on-board receiving coil 20 by the off-board inductive transmitter coil 10.

Referring again to FIGS. 1 and 1A, the inductive charger alignment system 100a, 100b can be employed to maximize the charging efficiency of one or more power sources 120 of the vehicle 1. The power source 120 can be a battery for an electric or hybrid-electric engine that powers vehicle 1. In certain aspects, the power source 120 can be a battery employed in a passive system of the vehicle 1, e.g., an anti-theft system. In another embodiment, the power source 120 can be any of a number of rechargeable batteries employed in electronic systems of a vehicle 1 in the form of a modern or classic automobile.

As also depicted in FIGS. 1 and 1A, the alignment controller 50 is preferably located on-board the vehicle 1. More particularly, there is significant flexibility in locating the alignment controller 50 within the vehicle 1, provided that it can be easily coupled to the other components of the inductive charger alignment system 100a, 100b. As such, it is preferable to locate the alignment controller 50 within the engine compartment of the vehicle 1. One advantage of situating the alignment controller 50 on-board the vehicle 1 is that the overall cost of the charger alignment system 100a, 100b can be reduced. In particular, such systems with an on-board alignment controller 50 can have a low overall cost in the sense that a vehicle having such a system can be inductively charged in various locales having a simple and relatively low cost, off-board inductive transmitter coil 10 and power source 4 arrangement. In comparison, a primarily off-board arrangement that requires a transmitter coil, power source, signal/display device and an off-board controller at each charging locale would have a much higher overall system cost.

In other aspects of the inductive alignment charger alignment system 100a, 100b, the alignment controller 50 can be located off-board the vehicle 1, preferably coupled to the off-board inductive transmitter 10 and power source 4. In such embodiments, the controller 50 should be wirelessly coupled to the on-board inductive receiving coil 20 and signal element 40 to communicate the alignment 30 between the on-board receiving coil 20 and the off-board transmitter coil 10 to the signal element 40.

Referring again to FIGS. 1 and 1A, the signal element 40 of the inductive charger alignment system 100a, 100b can include any of a variety of signal components and assemblies capable of directly or indirectly communicating the alignment 30 between the off-board inductive transmitter coil 10 and on-board inductive receiving coil 20. Preferably, the signal element 40 is a vehicular signal component with a primary function, in addition to the function of communicating the alignment 30, to advantageously reduce the overall cost of the system 100a, 100b. For example, the signal element 40 can be one or more headlamps (e.g., headlamps 40a, 40b), turn signals, fog lights, dashboard lights, interior display lights, graphical user interfaces (GUI) within an interior display, and other signal components and assemblies. In other aspects of the system 100a, 100b, the signal element 40 is one or more signal assemblies (e.g., a dedicated set of on-board lights in the dashboard, A-pillar or other location within the visual sightline of the driver 2) specifically arranged to communicate the alignment 30 information to the driver 2. Another aspect of the inductive charger alignment system 100a, 100b can employ a signal element 40 in the form of a mobile phone or other electronic device of the driver 2 that is wirelessly coupled to the vehicle 1 (e.g., a mobile phone connected to the vehicle via a Bluetooth connection).

Referring now to FIGS. 2A and 2B, an aspect of the inductive charger alignment system 100a is depicted in schematic form to demonstrate the ability of the system to communicate alignment 30 information to the driver 2 (not shown) of the vehicle 1. In particular, the alignment controller 50 can assess the charging signal generated within the on-board inductive receiving coil 20 and compare it to a predetermined, maximum charging level that corresponds to a minimum alignment distance between the coils 10, 20. Thus, an optimal alignment condition between the coils 10, 20 occurs when the alignment 30, as corresponding to the actual alignment between the coils 10, 20, approaches the minimum alignment distance between the coils 10, 20. As shown in FIG. 2A, the alignment 30 can reflect a misalignment in the vehicle forward direction of the on-board receiving coil 20 relative to the off-board transmitter coil 10. As shown in FIG. 2B, the alignment 30 can also reflect misalignment components $30_Y$ and $30_X$ in the vehicle forward and side-to-side directions, respectively, of the on-board receiving coil 20 relative to the off-board transmitter coil 10 with regard to the optimal alignment position between the coils 10, 20. Hence, misalignment components $30_Y$ and $30_X$ will approach and reach zero as the vehicle 1 is positioned by the driver 2 to effect optimal alignment between the coils 10, 20 for purposes of inductive charging efficiency.

Also referring to the inductive charger alignment system 100a depicted in FIGS. 2A and 2B, the alignment controller 50 can vary the frequency, intensity or other output variable associated with the signal element 40 to communicate the alignment 30 of the inductive receiving and transmitter coils 10, 20 to the driver 2, recognizing that the alignment 30 can incorporate vehicle forward misalignment $30_Y$ and/or vehicle side-to-side misalignment $30_X$ components. For example, the controller 50 can increase the frequency of illumination of the signal element 40, (e.g., headlamp 40a as shown in FIG. 1A) as a function of alignment 30 as it approaches the minimum alignment distance between the coils 10, 20. The driver 2 may not appreciate the actual misalignment components $30_X$ and $30_Y$ of the alignment 30 communicated via the system 100a given that the system may, in certain embodiments, only include one on-board receiving coil 20 and one off-board transmitter coil 10. Nevertheless, the driver 2 of a vehicle 1 containing an inductive charger alignment system 100a can move the vehicle 1 through simple trial and error using feedback from the signal element 40 until the minimum alignment distance between the coils 10, 20 is realized. Similarly, the controller 50 can decrease the frequency of illumination of the signal element 40, or headlamp 40a (see FIG. 1A) as the alignment 30 increases relative to the minimum alignment distance between the coils 10, 20. The net effect is that the driver 2 of the vehicle 1 containing the inductive charger alignment system 100a, 100b can receive the alignment 30 associated with the coils 10, 20 from the signal element 40 and use that information to adjust the location of the vehicle 1 to maximize inductive charging efficiency for the power source 120 (see FIG. 1A) coupled to the on-board receiving coil 20.

Turning now to FIGS. 3A-3C, an aspect of the inductive charger alignment system 100b is depicted in schematic form to demonstrate the ability of the system to communicate alignment 30 information, particularly misalignment components $30_X$ and $30_Y$, to the driver 2 (not shown) of the vehicle 1. As noted earlier, the inductive charger alignment system 100b can include a plurality of coils that make up the on-board inductive receiving coil 20. As depicted in exemplary form in FIGS. 3A-3C, the inductive charger alignment system 100b includes an on-board receiving coil 20 consisting of three on-board inductive receiving coils 20a, 20b and 20c. The coil 20a is located vehicle forward of coils 20b and 20c. Further, coils 20b and 20c are located in a side-by-side orientation. Together, the surface area of coils 20a, 20b and 20c, and the spacing between them, can roughly approximate the surface area of the off-board inductive transmitter coil 10. Further, the alignment controller 50 can assess the charging signals generated within the on-board inductive receiving coils 20a, 20b and 20c and compare each of them to a predetermined, maximum charging level that corresponds to a minimum alignment distance between the coils 10, 20a-20c. Thus, an optimal alignment condition between the coils 10, 20a-20c occurs when the alignment $30_a$-$30_c$, as corresponding to the actual alignment between the off-board transmitter coil 10 and each of the on-board receiving coils 20a, 20b and 20c, respectively, approaches the minimum alignment distance between the coils 10, 20a-20c. As shown in FIG. 3A, the alignment 30 can reflect alignment components $30_a$, $30_b$ and $30_c$ associated with the alignment of the on-board receiving coils 20a, 20b and 20c relative to the off-board transmitter coil 10, respectively.

As depicted in FIG. 3B, the alignment 30 can also reflect misalignment components $30_{Ya}$, $30_{Xa}$ and $30_{Xc}$ in the vehicle forward and side-to-side directions, respectively, of the on-board inductive receiving coils 20a and 20c relative to the off-board transmitter coil 10, respectively. Alignment controller 50 can discern components $30_{Ya}$, $30_{Xa}$ and $30_{Xc}$ based on a comparison of the actual, measuring charging signals associated with each of the on-board coils 20a, 20b and 20c relative to the charging signal for each of these coils when in an optimal alignment position relative to the off-board inductive transmitter coil 10. For example, in the alignment depicted in FIG. 3B, the controller 50 can recognize that coil 20b is in an optimal alignment position relative to the off-board coil 10 by measuring an actual charging level that is substantially equivalent to a charging level when then on-board coil 20b and off-board coil 10 are in an optimal alignment relationship. With the recognition that coil 20b is in an optimal alignment position, the controller 50 can further recognize that coils 20a and 20c are misaligned by components $30_{Ya}$, $30_{Xa}$ and $30_{Xc}$ upon measuring a less-than-optimum charging levels of coils 20a and 20c. Note that the on-board receiving coil 20b, as depicted in FIG. 3B, is in an optimal alignment position relative to the off-board transmitter coil 10 and thus the misalignment components $30_{Xb}$ and $30_{Xa}$ are zero.

Referring now to FIG. 3C, the alignment 30 between the off-board inductive transmitter coil 10 and the on-board inductive receiving coil 20 can also reflect misalignment components $30_{Yb}$, $30_{Yc}$, $30_{Xa}$ and $30_{Xb}$ in the vehicle forward and side-to-side directions, respectively, of the on-board receiving coils 20a, 20b and 20c relative to the off-board transmitter coil 10, respectively. Note that none of the on-board receiving coils 20a, 20b and 20c, as depicted in FIG. 3C, are in an optimal alignment position relative to the off-board transmitter coil 10; consequently, misalignment components (e.g., $30_{Yb}$, $30_{Yc}$, $30_{Xa}$ and $30_{Xb}$) are present for each of the coils 20a, 20b and 20c.

Referring again to FIGS. 3A-3C, the alignment controller 50 of the inductive charger alignment system 100b can vary the frequency, intensity or other output variable associated with the signal element 40 to communicate alignment 30 information in the form of misalignment components ($30_{Xa}$, $30_{Xb}$, $30_{Xc}$, $30_{Ya}$, $30_{Yb}$, and $30_{Yc}$) of the inductive off-board transmitter and on-board receiving coils 10, 20 to the driver 2. For example, the controller 50 can increase the frequency of illumination of right and left headlamps 40a and 40b (when employed as the signal element 40) as a function of the misalignment components in the vehicle side-to-side direction, e.g., $30_{Xa}$, $30_{Xb}$ and $30_{Xc}$, as the coils 20a, 20c or 20b, 20c are located left or right of the off-board transmitter coil 10. Similarly, the signal element 40 can also include another signal element (e.g., left and right fog lights, a GUI on an interior display, etc. that are independent from left and right headlamps 40a, 40b) coupled to the alignment controller 50. The controller 50 can then vary the frequency, intensity or other output variable associated with this additional signal element to communicate the misalignment components in the vehicle forward and rearward directions e.g., $30_{Ya}$, $30_{Yb}$ and $30_{Yc}$, as the coils 20b and 20c, 20a or 20a, 20b and 20c are located vehicle forward or rearward of the off-board transmitter coil 10. The net effect is that the driver 2 of the vehicle 1 containing the inductive charger alignment system 100b can receive the alignment 30 associated with the coils 20a, 20b and 20c relative to the off-board inductive transmitter coil 10, including misalignment components (i.e., $30_{Xa}$, $30_{Xb}$, $30_{Xc}$, $30_{Ya}$, $30_{Yb}$, and/or $30_{Yc}$) and use that information to adjust the location of the vehicle 1 to maximize inductive charging efficiency for the power source 120 (see FIG. 1A) coupled to the on-board receiving coil 20.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

Advantageously, vehicles having inductive charger alignment systems according to the disclosure can be efficiently charged in various locales (e.g., an attached garage at home, a parking lot at work, an airport parking lot, etc.) having an off-board transmitter coil. Further, the off-board components of these systems are generally limited to the off-board transmitter coil and a power supply for the coil. The limited amount of off-board components minimizes the overall system cost, particularly for commercial sites having ownership that differs from the ownership of the vehicle having the inductive charger alignment system (e.g., airport parking lot). As these systems gain prevalence within vehicles, various commercial entities are more likely to configure their respective parking lots with relatively low cost off-board transmitter coils and power supplies to gain a marketing advantage in attracting owners of vehicles having such systems to frequent their establishments.

Another distinct advantage of vehicles with the inductive charger alignment systems of the disclosure that include an on-board signal element is that they can operate in various environments with a transmitter coil (e.g., outdoor, open-air parking lots, attached garages within a home, etc.). The vehicles containing these systems are not dependent upon a fixed signal element for conveying alignment information that is coupled to another structure (e.g., a wall of a garage stall having a display that conveys alignment information). As such, vehicles having these inductive charger alignment systems can be charged in various locales with high efficiency, including locales with off-board transmitter coils that are not conducive to the installation or inclusion of a fixed signal element, e.g., open-air parking lots.

Certain aspects of the disclosure also relate to inductive charger alignment systems with an additional oil heating capability. These systems employ on-board inductive charger receiver coil(s) coupled to or in proximity to an oil pan of the vehicle. Advantageously, vehicles containing such systems having the foregoing inductive charger alignment features, can also be employ these systems to heat the oil of its engine (e.g., a hybrid-electric vehicle engine, internal gas combustion engine). By heating the oil in the oil pan of the engine, these dual-capability inductive charger alignment systems can facilitate ease of engine starting in cold weather, less power usage by the starter motor and the ability to start the engine in particularly severe environments requiring engine oil heating.

Another advantage of the inductive charger alignment systems in this disclosure relates to overall system cost. In particular, these systems' reliance on on-board signal elements including but not limited to headlamps, vehicle audio system speakers, and interior parking sensor systems displays minimizes the overall cost of the system. That is, the inductive charger alignment systems of the disclosure employ on-board signal elements such that these elements attain a dual use—e.g., headlamps that provide illumination of the road and information related to the alignment of on-board inductive receiving coil(s) and an off-board inductive transmitter coil to the driver. In contrast, conventional inductive charger systems can rely on external or off-board signal (e.g., visual displays, stand-alone control units, etc.), which add to the overall system cost.

Variations and modifications can be made to the aforementioned structure without departing from the concepts of the present invention. For example, various quantities and positional arrangements of one or more coils that make up the on-board inductive receiving coil 20 and/or off-board inductive transmitter coil 10 can be employed by the inductive charger alignment systems of the disclosure to effect a communication of misalignment components to the driver for purposes of positioning the vehicle for maximum inductive charging efficiency. It should also be understood that additional positional sensors can be employed independent from the coils 10, 20 on the vehicle to provide information to the controller 50 such that it can provide further alignment-related information to the driver associated with the alignment of the coils 10, 20. Such variations and modifications, and other embodiments understood by those with skill in the field within the scope of the disclosure, are intended to be covered by the following claims unless these claims by their language expressly state otherwise.

What is claimed is:

1. An inductive charger alignment system for a vehicle, comprising:
    an on-board inductive receiving coil adapted to charge an on-board power source;
    an alignment controller coupled to the receiving coil; and
    a headlamp coupled to the controller,
    wherein the controller is configured to vary an illumination state of the headlamp to communicate an alignment between the receiving coil and an off-board inductive transmitter coil to an on-board driver.

2. The system of claim 1, further comprising:
    an alarm element coupled to the controller and in proximity to the driver, wherein the controller is further configured to direct the alarm element to communicate the alignment by varying an audible state of the alarm element.

3. The system of claim 2, further comprising:
    an on-board sensor configured to provide an input to the controller based on reflected light from the headlamp,
    wherein the controller is further configured to direct one of the alarm element and the headlamp to communicate the alignment based at least in part on the input from the sensor.

4. The system of claim 1, wherein the on-board inductive receiving coil is affixed to a non-metallic component on the underside of the vehicle.

5. The system of claim 1, wherein the on-board inductive receiving coil is affixed to an oil pan coupled to an engine of the vehicle and the coil is further configured to heat oil in the oil pan upon charging from the off-board inductive transmitter coil.

6. An inductive charger alignment system for a vehicle, comprising:
    a plurality of on-board inductive receiving coils adapted to charge an on-board power source;
    an alignment controller coupled to the receiving coils; and
    an on-board signal element comprising a headlamp coupled to the controller,
    wherein the controller is configured to vary an illumination state of the headlamp to communicate an alignment between the receiving coils and an off-board inductive transmitter coil to an on-board driver.

7. The system of claim 6, wherein the on-board signal element further comprises an alarm element coupled to the controller and in proximity to the driver, and the controller is further configured to direct the alarm element to communicate the alignment by varying an audible state of the alarm element.

8. The system of claim 7, further comprising:
    an on-board sensor configured to provide an input to the controller based on reflected light from the headlamp,
    wherein the controller is further configured to direct one of the alarm element and the headlamp to communicate the alignment based at least in part on the input from the sensor.

9. The system of claim 6, wherein the alignment comprises vehicle forward and side-to-side alignment between the receiving coils and the off-board inductive transmitter coil.

10. The system of claim 6, wherein the on-board inductive receiving coils are affixed to a non-metallic component on the underside of the vehicle.

11. The system of claim 6, wherein the on-board inductive receiving coils are affixed to an oil pan coupled to an engine of the vehicle and the coil is further configured to heat oil in the oil pan upon charging from an off-board inductive transmitter coil.

12. An inductive charger alignment system for a vehicle, comprising:
    a plurality of on-board inductive receiving coils adapted to charge an on-board power source;
    an alignment controller coupled to the receiving coils;
    an on-board signal element comprising a headlamp coupled to the controller; and
    an off-board inductive transmitter coil,
    wherein the controller is configured vary an illumination state of the headlamp to communicate an alignment between the receiving coils and the transmitter coil to an on-board driver.

13. The system of claim 12, wherein the on-board signal element further comprises an alarm element coupled to the controller and in proximity to the driver, and the controller is further configured to direct the alarm element to communicate the alignment by varying an audible state of the alarm element.

14. The system of claim 13, further comprising:
    an on-board sensor configured to provide an input to the controller based on reflected light from the headlamp,
    wherein the controller is further configured to direct one of the alarm element and the headlamp to communicate the alignment based at least in part on the input from the sensor.

15. The system of claim 12, wherein the alignment comprises vehicle forward and side-to-side alignment between the receiving coils and the off-board inductive transmitter coil.

16. The system of claim 12, wherein the on-board inductive receiving coils are affixed to a non-metallic component on the underside of the vehicle.

17. The system of claim 12, wherein the on-board inductive receiving coils are affixed to an oil pan coupled to an engine of the vehicle and the coil is further configured to heat oil in the oil pan upon charging from an off-board inductive transmitter coil.

* * * * *